United States Patent Office

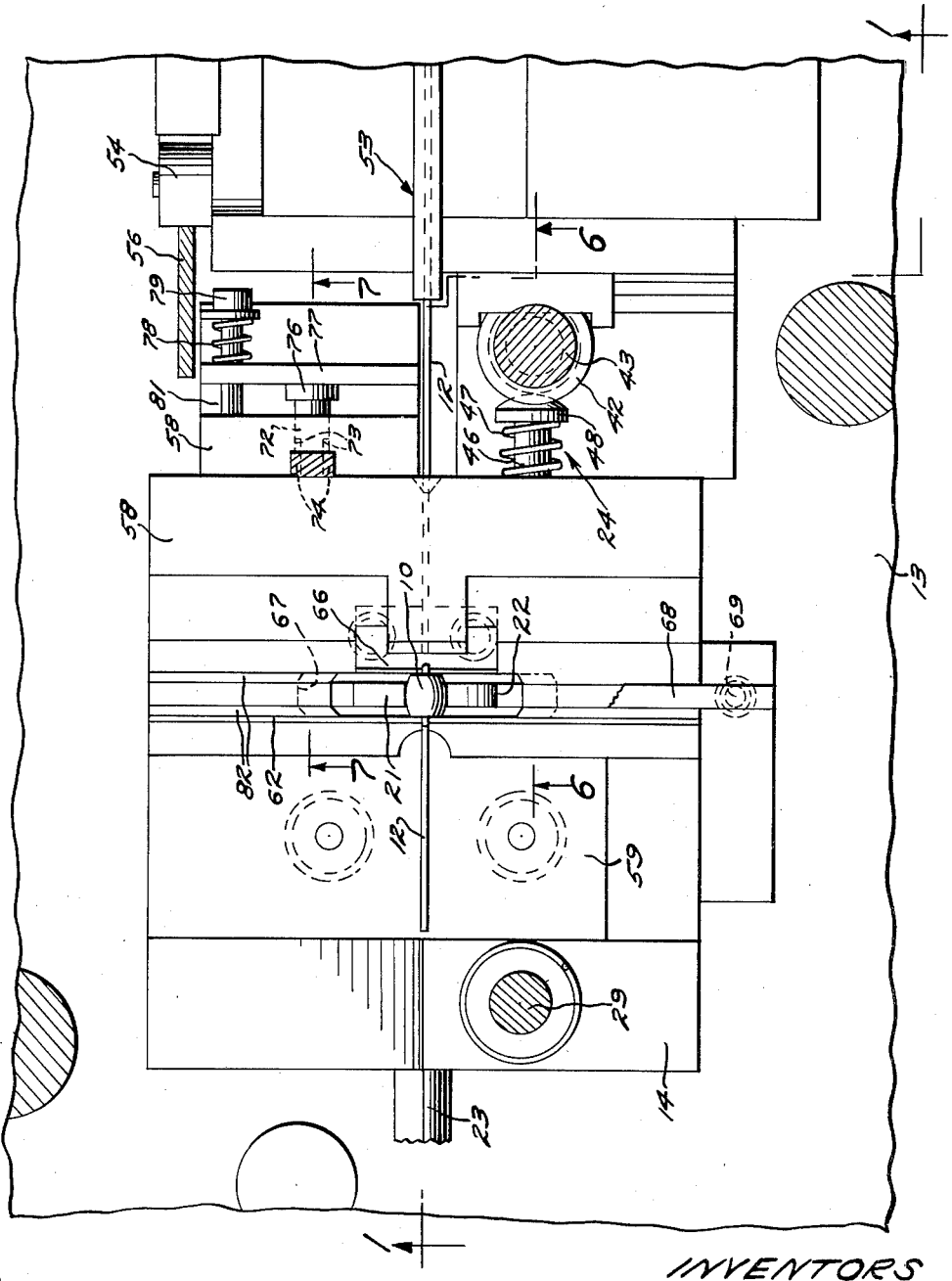

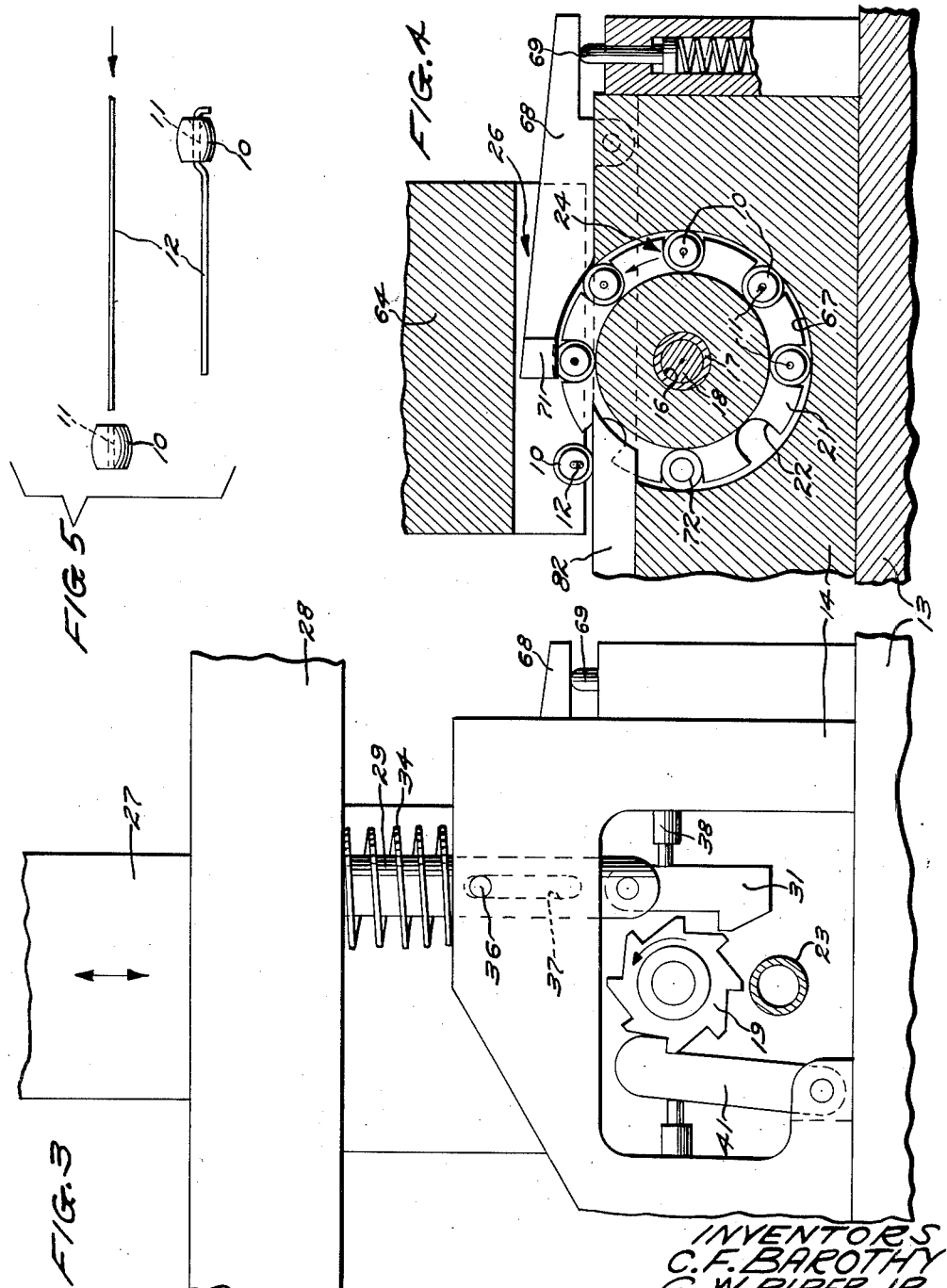

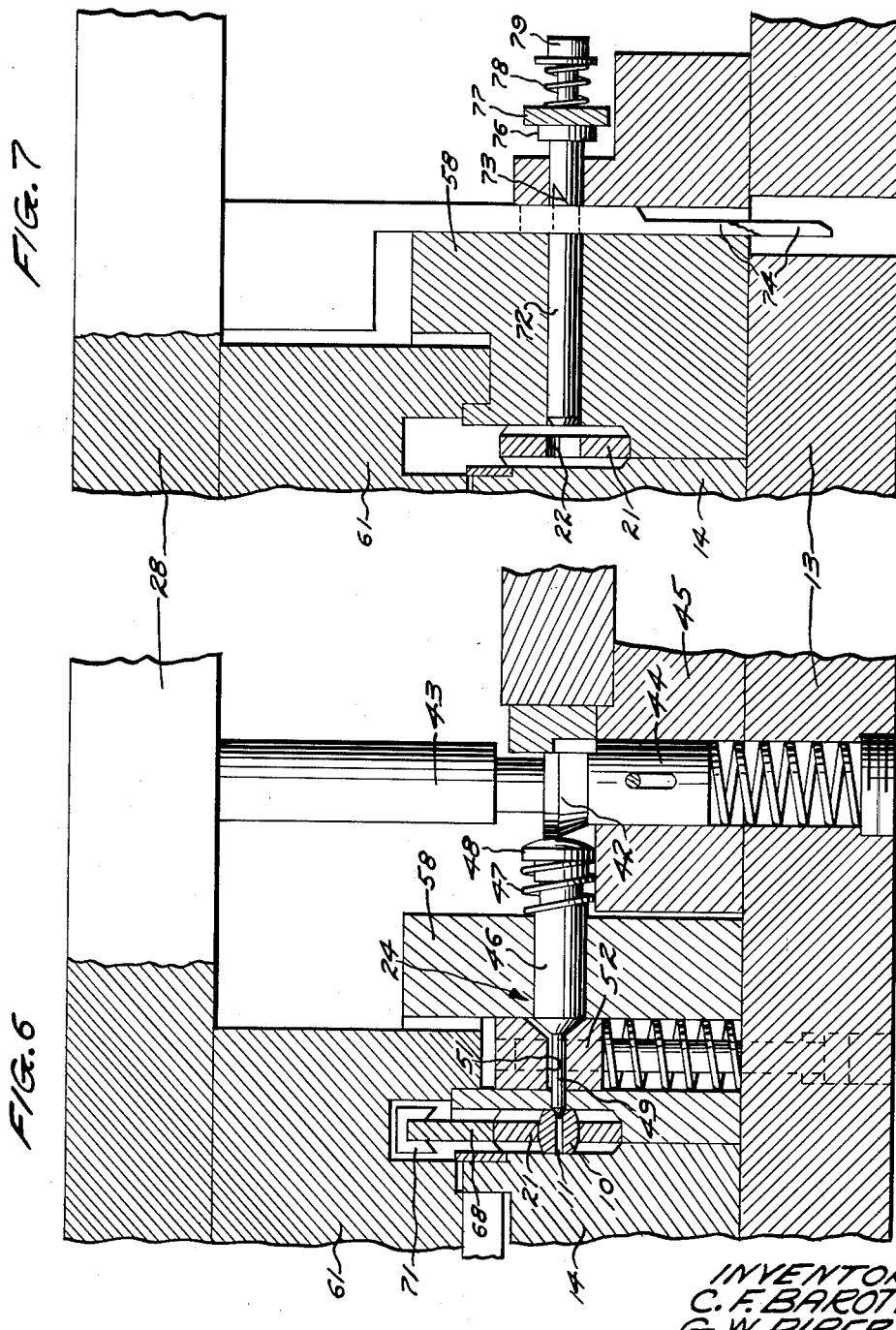

2,988,114
Patented June 13, 1961

1

2,988,114
APPARATUS FOR ASSEMBLING AND
FABRICATING ARTICLES
Charles F. Barothy and George W. Piper, Jr., Indianapolis, and Raymond E. Salbeck, Lawrence, Ind., assignors to Western Electric Company, Incorporated, New York, N.Y., a corporation of New York
Filed June 4, 1959, Ser. No. 818,197
2 Claims. (Cl. 140—93)

This invention relates to apparatus for assembling and fabricating articles, and more particularly to an automatic machine for feeding lengths of rod into a succession of apertured balls whereafter each length of rod is severed and formed about each ball.

In many types of assembly operations, it is necessary to insert a first element within a second and then secure the assembled elements together. These operations can be readily performed by manual assembly and forming steps or by separate and distinct machine facilities for performing each individual operation. Where automatic machines are to be utilized without any intervening manual effort, it is necessary that there be provided automatic facilities for feeding the various elements in proper sequence together with facilities for performing various fabricating operations on the articles.

It is a principal object of the present invention to provide new and improved apparatus for assembling and fabricating articles.

A further object of the invention resides in an economical machine for automatically feeding lengths of rod into a succession of apertured members and subsequently severing and forming each rod about each apertured member.

Another object of the invention is the provision of a machine having a reciprocating member for controlling the cyclic operation of a plurality of assembling and fabricating mechanisms together with the operation of a plurality of article feed mechanisms.

A still further object of the invention resides in a disc feed device operating in a vertical plane in conjunction with a vertically reciprocating ram and a plurality of horizontally moving mechanisms.

It is an additional object of the invention to provide a machine having facilities for locking an article feed mechanism in position during the advance of a length of rod into an apertured member.

With these and other objects in view, the present invention contemplates a feed disc having a plurality of equally spaced circumferential recesses into which are cyclically advanced apertured clapper balls. A cyclically operating ram indexes the disc to move each clapper ball into alignment with a coining or flaring tool mechanism that is operated by the ram to flare each aperture. The disc subsequently advances each clapper ball into an assembly and fabricating mechanism that is also controlled by the ram to advance a length of rod stock into the flared aperture whereafter the rod is severed and formed about the ball. A locking device is also controlled by the ram to engage one of the recesses, whereupon the disc is accurately located to positively position the balls during the operation of the coining and rod advancing mechanism.

Other objects and advantages of the present invention will be apparent from the following detailed description when considered in conjunction with the accompanying drawings, wherein:

2

FIG. 2 is a top plan view taken along line 2—2 of FIG. 1 of the machine particularly illustrating facilities for coining each clapper ball and locking a clapper ball feed disc in place;

FIG. 3 is an end view taken along line 3—3 of FIG. 1 showing a pawl and ratchet mechanism for advancing a clapper ball feed disc;

FIG. 4 is a sectional view taken along line 4—4 of FIG. 1 showing the clapper ball feed disc together with clapper ball holding and ejecting facilities;

FIG. 5 shows two views of a clapper ball and a rod prior to and subsequent to assembling and fabricating operations by the machine shown in the other views;

FIG. 6 is a sectional view taken along line 6—6 of FIG. 2 illustrating a coining punch together with an operating mechanism therefor, and FIG. 7 is a sectional view taken along line 7—7 of FIG. 3 illustrating a locking pin for accurately holding the clapper ball feed disc in position during fabricating operations.

Figure 1:
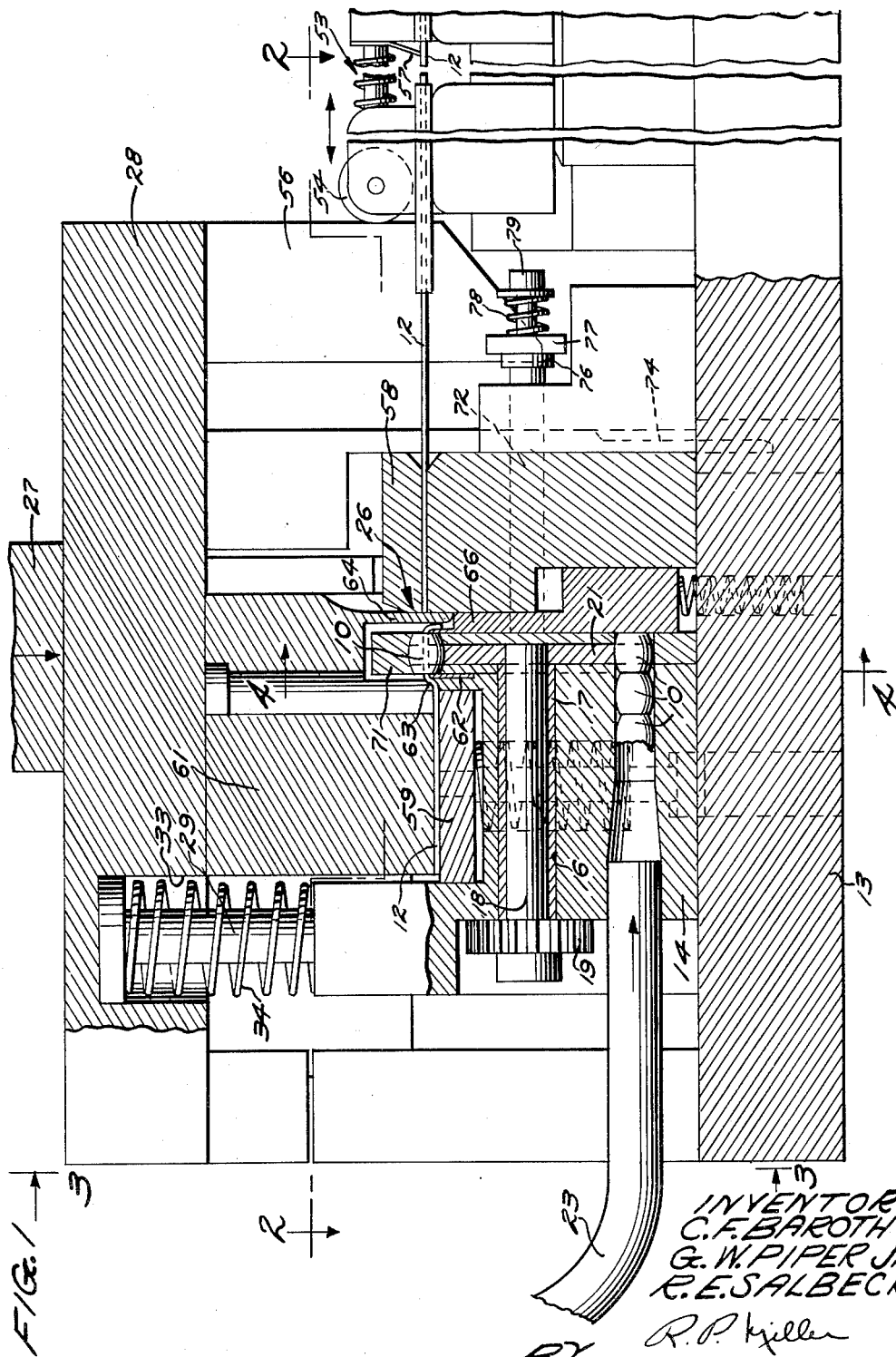
FIG. 1 is a side elevational view partially in section depicting an automatic machine for assembling and fabricating clapper balls and rods in accordance with the principles of the invention.

The present invention is described with relation to the fabrication of a clapper ball and rod which is utilized in the manufacture of a telephone handset. The operations to be performed by the apparatus of the present invention may be initially appreciated by the reference to FIG. 5 wherein there is illustrated a clapper ball 10 having an aperture 11 formed therein which is adapted to receive a rod 12 that is formed about the ball in the manner illustrated in the lower illustration of FIG. 5.

Attention is now directed to the other figures, and particularly to FIGS. 1, 2 and 3 which depict a base 13 having a block or frame 14 mounted thereon to extend in an upward direction. The block 14 is provided with a bore 16 to accommodate a sleeve bearing 17 into which is mounted a shaft 18 having a ratchet 19 attached to one end and a feed disc 21 attached to the other end. The disc 21 is provided with a series of eight equally and circumferentially spaced recesses 22 (see FIG. 4), each shaped to receive and accommodate a clapper ball 10.

The balls 10 are loaded by suitable feed means into an inclined chute 23. The chute 23 may be vibrated to facilitate the movement of the balls 10 by gravity into the lowermost recess 22 formed in the disc 21. The disc 21 is cyclically indexed to advance each clapper ball into alignment with a flaring or coining device generally denoted by the reference numeral 24, and then into alignment with an assembly and fabricating device generally denoted by the reference numeral 26.

In order to effectuate the advance of the disc, there is provided a ram 27 of a press adapted to be reciprocated by a hydraulic or pneumatic cylinder or by other mechanical or electrical instrumentalities to move toward and away from the block 14 and the disc 21. Attached to the ram 27 is a platen 28 having a rod 29 positioned therein and extending from the face thereof to provide a mounting for a pawl 31 adapted to engage and advance the ratchet 19. The rod 29 is positioned within a recess 33 formed in the platen 28 and has a spring 34 mounted thereabout to engage the upper surface of the block 14. The rod 29 is also provided with a pin 36 that rides within a guide slot 37 formed in the block 14. A resilient stop 38 mounted on the block 14 urges the pawl into engagement with the teeth of the ratchet 32 to prevent retrograde movement of the ratchet during advance of the pawl 31 over the ratchet teeth.

The coining or flaring device 24 is operated by a cam 42 attached to a rod 43 extending from the platen 28 (see FIG. 6). A spring-urged pusher 44 is mounted in an upper section 45 of the base 13 to engage and cushion the cam in its downward movement. The flaring device 24 comprises a punch 46 having a spring 47 mounted thereabout to urge a cam follower button 48 into engagement with the cam 42. An extension 49 of the punch 46 is adapted to move through a flared aperture 51 of a spring-urged collar member 52 into the aperture 11 formed in a clapper ball 10. The flared aperture 51 provides a cam surface to act against the tapered section of the punch 46 to further urge the cam follower button 48 into engagement with the cam 42. Upon operation of the flaring device 24, the aperture 11 of the ball 10 is flared thus providing an entryway for facilitating the subsequent insertion of the rod 12.

Referring again to Figs. 1 and 2, which best illustrate the assembling and fabricating device 26, there is shown a commercially available rod feed mechanism 53 having a cam follower roller 54 for engaging a bar cam 56 extending from the platen 28. Upon downward movement of the bar cam 56, cam roller 54 is pushed toward the right to withdraw the feed mechanism 53 thereby permitting a spring-urged feed pawl 57 to slide over the rod stock 12. Upon upward movement of the bar cam 56, the feed mechanism 53 moves toward the left thus permitting the spring-urged feed pawl 57 to positively engage and advance a length of stock through a guide block 58 into a flared aperture 11 of an aligned ball 10. A sufficient length of bar stock 12 is advanced to slide over a spring-urged pad 59 positioned in alignment with a forming block 61 attached to the lower surface of the platen 28. The block 14 is provided with a hardened steel forming insert 62 which cooperates with a forming surface 63 of the forging block 61 to impart a bend to the rod 12 thereby precluding movement of the ball 10 toward the left along the rod 12. A severing and forming element 64 is also attached to the platen 28 and is adapted to cooperate with a spring-urged forming slide 66 and the guide block 58 to sever and form a righthand section of the rod 12. The righthand severed and formed section of the rod 12 precludes the movement of the pawl 10 toward the right, and thus it may be appreciated that the ball 10 is locked on the rod 12.

In order to hold the balls 10 in position during the advance of the disc 21 and the operation of both the flaring mechanism 24 and the rod feed and forming mechanism 26, three facilities are provided, the first of which is an arcuate recess 67 formed in the block 14 (see FIG. 4) which functions to retain the balls 10 in the recesses 22 during advance of the disc into the assembling and fabricating mechanism 26. In order to hold the ball 10 in position during the assembling and forming of the rod 17, a second device is provided which includes a lever 68. This lever is pivotally mounted on the block 14 and is urged by a spring-biased pin 69 to move a holding head 71 into engagement with the ball 10 positioned to receive a length of rod 12.

The third positioning facility includes a tapered shot pin 72 (see FIGS. 2 and 7) having a pair of oppositely disposed cam slots 73 formed therethrough to accommodate a pair of bar cams 74 extending downwardly from the platen 28. The righthand end of the shot pin 72 is provided with a head 76 that engages a slide bar 77 that is urged by a spring 78 acting against a cap 79 attached to a stud shaft 81 anchored to the guide block 58. The shot pin 72 is of such a size as to be substantially equal to the size of a recess 22 so that upon movement of the shot pin into the recess 22, the disc 21 is locked in position. The contour of the bar cam 74 is selected so as to hold the disc 21 in a locked position during the initial downward movement of the platen 28 when the flaring punch 46 is being rendered effective to flare the aperture 11 formed in the ball 10. During the initial upward movement of the platen 28, the shot pin 72 is held within a recess 22 while the feed device 53 advances the rod stock 12 into the aperture 11 of the ball 10 positioned in the fabricating and feeding mechanism 26. The bar cam is effective to hold the shot pin 72 in a withdrawn position when the platen 28 is moved in an upward direction to move the pawl 31 to advance the ratchet 32 and hence the disc 21.

In order to eject the fabricated rod 12 and ball 10 from the disc 21, a pair of spaced ejector plates 82 are mounted on the block 14 to span the disc 21 and engage the rod 12 as the disc 21 is rotated. The plates 82 may be provided with an inclined surface to facilitate the movement of the assembled ball and rod from the apparatus or the plates can be horizontal and each subsequent ejected ball and rod will push the previously ejected ball and rod from the apparatus.

Briefly recapitulating on the overall operation, the balls 10 are fed into the disc 21 and each ball is subsequently advanced into a position where the flaring mechanism 24 functions to flare each aperture 11. Each flared ball is then advanced into the fabricating and feeding mechanism 26 to receive a section of rod 12 whereafter the apparatus functions to sever and form the rod about the ball 10. The assembled ball and rod is then ejected by cooperative action of the ejector plates 82 with the moving disc 21. It may be appreciated that there is provided a feed disc 21 that moves in a vertical plane which is the identical plane in which the platen 28 also moves to operate horizontally moving feed and fabricating devices, and hence, all necessary operations are controlled by a simple vertically reciprocating movement of a platen.

It is to be understood that the above-described arrangements of apparatus and construction of elemental parts are simply illustrative of an application of the principles of the invention and many other modifications may be made without departing from the invention.

What is claimed is:

1. In a machine for forming piece parts, a piece part carrier rotatable about an axis and having a plurality of circumferentially spaced recesses therein for receiving one each of said piece parts, means for intermittently rotating said carrier, a forming tool movable axially of said carrier and into forming engagement with piece parts arranged within successive ones of said recesses as said carrier is intermittently rotated, locking means movable axially of said carrier into successive ones of said recesses to lock said carrier firmly against rotation, a second forming tool movable in a plane perpendicular to said axis into forming engagement with piece parts supported by said carrier, ram means movable in a plane perpendicular to said axis for driving said second forming tool, ratchet means drivingly connecting said ram means to said carrier rotating means, and cam means drivingly connecting said ram means to said locking means and to said first-mentioned forming tool.

2. In a machine for assembling piece parts, a carrier for apertured parts rotatable about an axis and having a plurality of circumferentially spaced recesses therein for receiving one each of said apertured parts, means for intermittently rotating said carrier, a forming tool movable axially of said carrier and into forming engagement with apertured parts arranged within successive ones of said recesses as said carrier is intermittently rotated, locking means movable axially of said carrier into successive ones of said recesses to lock said carrier firmly against rotation, wire feeding means reciprocable axially of said carrier for advancing wire into the aperture of successive ones of said apertured parts within said carrier, a second forming tool movable in a plane perpendicular to said axis to sever and form said wire, ram means movable in a plane perpendicular to said axis for driving said second forming tool, ratchet means drivingly connecting said ram means to said carrier rotating means, and cam means drivingly connecting said ram means to said locking means, to said wire feeding means and to said first-mentioned forming tool.

References Cited in the file of this patent

UNITED STATES PATENTS

| | | |
|---|---|---|
| 756,212 | Campbell | Apr. 5, 1904 |
| 2,591,203 | Schmalz | Apr. 1, 1952 |
| 2,596,077 | Legat | May 6, 1952 |
| 2,627,104 | Whelan | Feb. 3, 1953 |